US012105596B2

(12) United States Patent
Challener

(10) Patent No.: US 12,105,596 B2
(45) Date of Patent: Oct. 1, 2024

(54) SECURELY BACKING UP AND RESTORING A COMPUTER SYSTEM USING A TRUSTED OS

(71) Applicant: Cyntegra Ltd, London (GB)

(72) Inventor: David C. Challener, Raleigh, NC (US)

(73) Assignee: CYNTEGRA LTD, London (GB)

( * ) Notice: Subject to any disclaimer, the term of this patent is extended or adjusted under 35 U.S.C. 154(b) by 410 days.

(21) Appl. No.: 17/367,719

(22) Filed: Jul. 6, 2021

(65) Prior Publication Data

US 2023/0009355 A1 Jan. 12, 2023

(51) Int. Cl.
*G06F 11/14* (2006.01)

(52) U.S. Cl.
CPC .............................. *G06F 11/1458* (2013.01)

(58) Field of Classification Search
CPC ............ G06F 11/1458; G06F 12/0284; G06F 12/1408; G06F 12/1441; G06F 12/1491; G06F 21/53; G06F 21/55; G06F 21/57; G06F 21/78; G06F 2212/1052; G06F 2221/2147; H04L 9/088; H04L 9/14; H04L 9/3234
See application file for complete search history.

(56) References Cited

U.S. PATENT DOCUMENTS

| | | | |
|---|---|---|---|
| 10,049,215 B2 | 8/2018 | Challener et al. | |
| 2006/0253724 A1* | 11/2006 | Zhang .................. | G06F 11/1451 714/E11.123 |
| 2017/0076096 A1* | 3/2017 | Challener ............ | G06F 11/1469 |
| 2020/0012803 A1* | 1/2020 | Mannan ............... | G06F 21/6218 |

FOREIGN PATENT DOCUMENTS

WO 2021107177 A1 6/2021

OTHER PUBLICATIONS

S. Demesie Yalew, G. Q. Maguire, S. Haridi and M. Correia, "Hail to the Thief: Protecting data from mobile ransomware with ransomsafedroid," 2017 IEEE 16th International Symposium on Network Computing and Applications (NCA), Cambridge, MA, USA, 2017, pp. 1-8, doi: 10.1109/NCA.2017.8171377. (Year: 2017).*
"TCG D-RTM Architecture", Document version 1.2.2, Jun. 17, 2013.
Grawrock , "The Intel Safer Computing Initiative", ISBN-10976483262 380 (2005).

(Continued)

*Primary Examiner* — Theodore C Parsons
(74) *Attorney, Agent, or Firm* — Kilpatrick Townsend & Stockton LLP

(57) ABSTRACT

Data of a computer system can be secured from malware. During a Primary Operating System (PrimaryOS) run-time, the system determines if the computer system has been compromised and, if so, a Trusted Operating System (TrustedOS) is launched and assumes control of the hardware resources and the software resources of the computer system. The TrustedOS obtains a cryptographic key that is inaccessible to the PrimaryOS. The TrustedOS uses the cryptographic key to disable writing to a first portion of the storage media that includes the first set of logical block addresses. The PrimaryOS can incrementally back-up files to a second set of logical block addresses on a second portion of the storage media. Control of the hardware resources and the software resources is returned to the PrimaryOS.

15 Claims, 8 Drawing Sheets

(56) References Cited

OTHER PUBLICATIONS

McCune et al., "Flicker: An execution infrastructure for TCB minimization", Proceedings of the 3rd ACM SIGOPS/EuroSys European Conference on Computer Systems 2008.

International Application No. PCT/GB2022/051725, International Search Report and Written Opinion mailed on Oct. 5, 2022, 15 pages.

* cited by examiner

SECURELY BACKING UP AND RESTORING A COMPUTER SYSTEM USING A TRUSTED OS

TECHNICAL FIELD

This disclosure relates generally to securing computer systems and networks. More particularly, but not necessarily exclusively, this disclosure relates to securely backing up and restoring a computer system.

BACKGROUND OF THE INVENTION

Digitization of information provides multiple advantages, including ease of transmission of information, reliability of records and easy duplication. However, digital records may also be vulnerable to various attacks from malicious actors, who may employ "malware" to steal or corrupt digital records from computer systems.

One category of malware is "ransomware" software, which often functions by encrypting the digital records of a user with an encryption key known only to the malicious actor. Given the strength of modern encryption algorithms, retrieving the digital records without knowledge of the encryption key may be, in practice, unfeasible. The malicious actor can then demand payment from the user in exchange of the encryption key that enables decryption of the encrypted digital records.

Modern ransomware is able to compromise the operating system of computers to encrypt stored data while remaining entirely undetected for long periods. In response, some anti-ransomware methods aim to securely store back-ups of data only when the system is deemed to be uncompromised. Such methods require the computing device to perform a predefined boot sequence to ensure that the system is uncompromised before storing backups on the secure storage.

Many modern computer systems are configured to be continuously operational, and as such cannot periodically reboot to perform the predefined boot sequence to protect files against malware. For example, servers or IoT devices are often installed and configured such that they provide an uninterrupted service for extremely long periods of time that can last months or even years. Therefore typical methods for performing safe backup, as described above, cannot be employed to secure these devices from ransomware attacks.

In view of the above, there is a need to provide improved ransomware protection for computing systems. In particular, there is a need for systems which are not required to reboot in order to provide safe back-ups of digital files.

SUMMARY OF THE INVENTION

According to a first aspect of the invention there is provided a method for backing up data in a computer system, wherein the computer system comprises a Primary Operating System (PrimaryOS) stored on a storage medium and configured to control the hardware resources and the software resources of the computer system, a secure element configured to provide root of trust measurement (RTM) operations, and one or more data backups, created by the PrimaryOS, and stored in a first backup portion of the storage medium, the method comprising: during a PrimaryOS run-time, loading a Trusted Operating System (TrustedOS) and pausing the execution environment of PrimaryOS, determining if the TrustedOS is in a predefined state based on a RTM operation provided by the secure element, in response to determining that the TrustedOS is in the predefined state, providing, by the secure element, the TrustedOS with authorization to make the first backup portion of the storage medium read-only, making the first backup portion of the storage medium read-only using the TrustedOS, configuring the PrimaryOS to perform a new backup in order to create a further data backup in a second backup portion of the storage media; and resuming the execution environment of the PrimaryOS.

According to a second aspect of the invention there is provided a method for backing up data in a computer system, wherein the computer system comprises a secure element configured to provide root of trust measurement (RTM) operations, a Hypervisor, having control of the hardware resources and the software resources of the computer system based on the secure element, a Primary Operating System (PrimaryOS) stored on a storage medium and provided at least a subset of the hardware resources and the software resources of the computer system by the Hypervisor, and one or more data backups, created by the PrimaryOS, and stored in a first backup portion of the storage medium, the method comprising: during a PrimaryOS run-time, pausing the execution environment of PrimaryOS, launching, by the Hypervisor, a Trusted Operating System (TrustedOS), providing, by the Hypervisor, the TrustedOS with authorization to make the first backup portion of the storage medium read-only, making the first backup portion of the storage medium read-only using the TrustedOS, configuring the PrimaryOS to perform a new backup in order to create a further data backup in a second backup portion of the storage media, and resuming the execution environment of the PrimaryOS.

Advantageously, the method of the first and second aspect enables data to be backed-up in an incremental manner without having to power off and reboot the computer system. Thus the normal functionality of the computer system is unaffected and the method can be applied to computing devices like servers or IoT devices that must provide continuous functionality for extremely long periods of time.

According to a third aspect of the invention there is provided a method for restoring data from a computer system, wherein the computer system includes: a Primary Operating System (PrimaryOS) for backing-up data from the computer system to a storage medium, a Recover Operating System (RecoveryOS) installed in a first read-only portion of the storage medium, and one or more data backups, created by the PrimaryOS, and stored in a second read-only portion of the storage medium, the method comprising: booting the computer system into the RecoveryOS, and retrieving, using the RecoveryOS, at least one of the one or more data backups from the second read-only portion of the storage medium.

Advantageously, the method of the third aspect enables securely restoring data from a computer system despite the computer system having been compromised. Furthermore, the method of the third aspect enables restoring the computer system to a predefined state at a previous point in time.

According to a fourth aspect of the invention there is provided an apparatus comprising a computer system and a storage media for implementing a method according to the first, second or third aspects described above.

According to a fifth aspect of the invention there is provided a computer program or suite of computer programs configured to execute a method according to the first, second or third aspects described above.

According to a sixth aspect of the invention there is provided a computer-readable medium having the computer program according to the fifth aspect of the invention.

BRIEF DESCRIPTION OF THE DRAWINGS

Embodiments of the invention will now be described, by way of non-limiting examples only, with reference to the following accompanying figures, in which.

DETAILED DESCRIPTION OF EMBODIMENTS OF THE INVENTION

Figure 1:
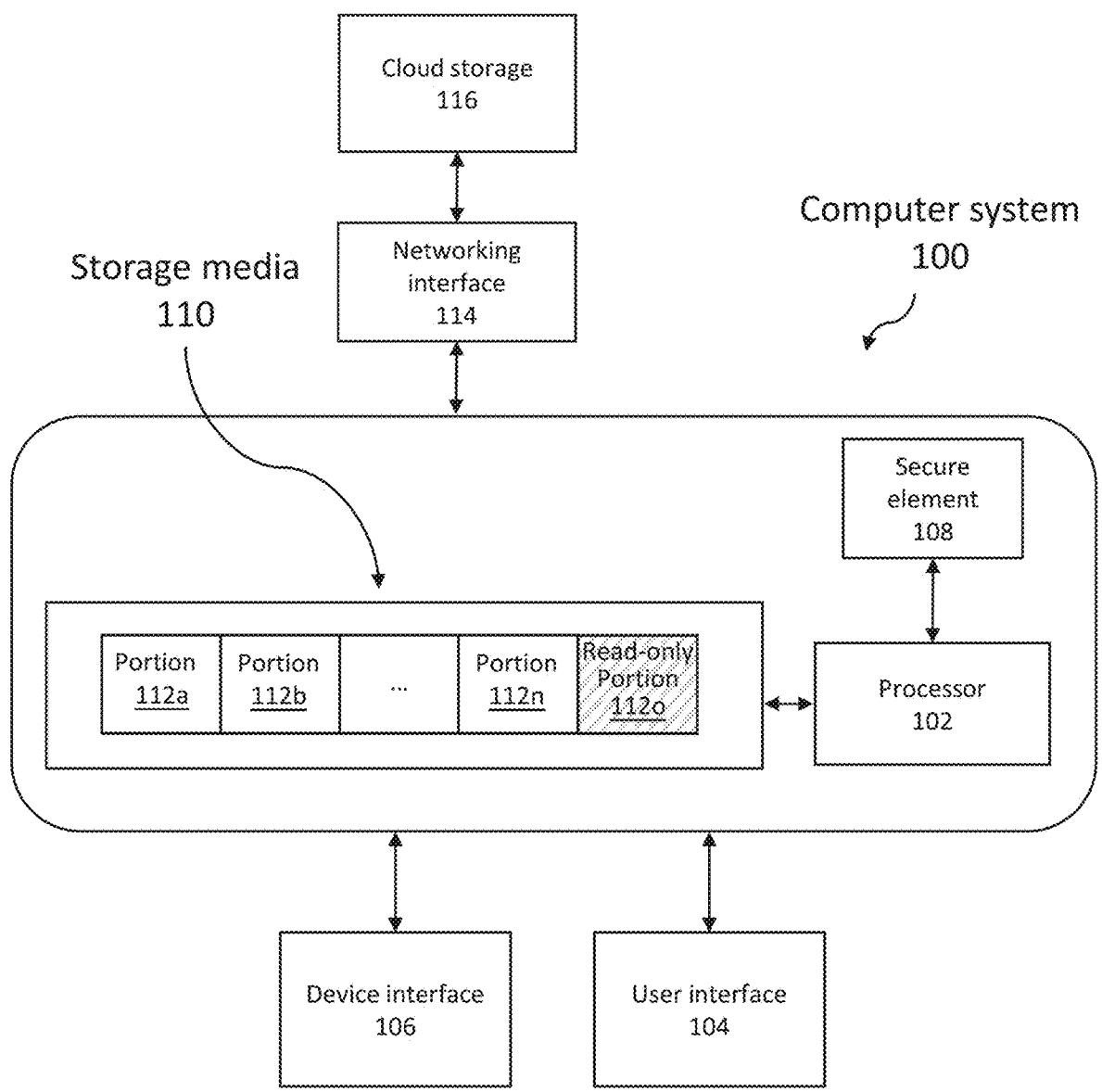
FIG. 1 is a schematic diagram of a system architecture of an apparatus like a server or laptop for providing ransomware protection.

The present invention relates to a method that can be used to protect data of computer system from ransomware attacks. The method relies on ensuring an accessible recent back-up of the data that the ransomware encrypts is still available to the user. Thus, the user can restore a recent version of the affected data, reducing the severity of the ransomware attack. The method is also applicable even when there is no malware attack, when a user wants to restore a computer system to a state in a previous point in time.

In one example, a server or other computer system is being used to keep data necessary for the operation of a business. The server comprises at least one storage media that can designate at least one region of that media as write-protected (read only), under control of a storage authorization (such as a password). The server also comprises a security element such as a TPM, which can be used to release use of an authorization only when there is evidence that a trusted, non-compromised, OS is running on the platform. The server also comprises a CPU which is designed to be used for dynamic launching of a TrustedOS. This can be done by following the DRTM specification of the Trusted Computing Group.

Given these hardware elements, the system is initially set up with a write protected region that has a Recovery Operating System (RecoveryOS) which can be optionally set as the default initial bootable OS. In some embodiments of the invention, the write protected region that has RecoveryOS also usually contains a complete copy of the initially set up production OS, or PrimaryOS. Additionally a region of the drive that may be adjacent to this region is configured to be readable and writable for writing a backup. Primary OS may be in another read/write region of the drive. The secure element is configured so that it will release the storage authorization only if either the dynamic TrustedOS is running in an uncompromised state or that the Trusted Recovery OS is running in an uncompromised state.

When the PrimaryOS is running, it may create an incremental backup in the first region set for backup. Periodically it may launch TrustedOS. When launched, TrustedOS requests the storage media authorization from the secure element. The TPM checks if the TrustedOS is identical to the copy designated as trusted, or alternatively if another root of trust can be verified. If it is, it releases the authorization to the TrustedOS. The TrustedOS then uses the authorization to make the newly created incremental backup write protected, designates a new area of the storage media as the target for the next incremental backup, destroys any lingering copy of the authorization of the storage media in memory, and returns control of the platform to the production OS.

In the case that the PrimaryOS gets compromised, a power cycle of the machine is used to bring the platform under the control of the RecoveryOS. This OS is write protected, so it cannot be compromised, and hence will be able to boot the system. The RecoveryOS requests the secure element give it the authorization for the storage media. The secure element checks that the RecoveryOS is running uncompromised and releases the authorization to the RecoveryOS.

The RecoveryOS may then provide the user with the ability to use the backed up PrimaryOS and a selected set of incremental backups to reset the system to the state it was in at a user selected previous time.

FIG. 1 schematically illustrates an apparatus that can be used to implement a method for protecting a computer system 100 from malware attacks, and specifically ransomware attacks. The computer system 100 may be a server, a laptop or a PC using x64 or x86 architecture. The computer system of FIG. 1 is configured to use a Primary Operating System (PrimaryOS) for incrementally backing-up files in a manner that provides malware protection, as explained in more detail below. PrimaryOS may be any operating system such as any version of MS Windows, any Linux distribution such as Debian, Red Hat Linux or the like, any version of MacOS or other Unix-based operating systems.

Computer system 100 comprises a processor 102. In other embodiments, the computer system may comprise multiple processors. Computer system 100 also comprises a user interface 104, a device interface 106 and a network interface 114. Each of these interfaces may be optional, depending on the particular computer system set-up. The user interface 104 may be used by a user to provide inputs to the computer system 100. The user interface 104 may comprise a keyboard, a mouse or a touch-based input device, or a combination of these. The user interface 104 may also provide an output which may be recognised by a user of computer system 100, such as a screen, a speaker or the like.

The device interface 106 enables peripheral devices (not shown) to be communicatively coupled to the computer system 100. These peripheral devices may comprise external storage devices, for example removable solid-state technology storage devices or self-encrypting devices. The networking interface 114 enables the computer system 100 to be communicatively networked with other devices (not shown), through local networks or the internet. The networking interface 114 may comprise a wired or wireless coupled with other devices. The networking interface 114 may enable the computer system 100 to store or retrieve data from an online or cloud storage 116.

Computer system 100 also comprises a secure element 108. The security element 108 may be a secure cryptoprocessor such a Trusted Platform Module (TPM). For example, the TPM 108 may comply with the TPM 2.0 specification or previous TPM specifications. The secure element is communicatively coupled to the processor 102. The TPM 108 is a dedicated processor designed to undertake secure cryptographic operations. For example, the TPM 108 may be used to secure hardware of the computer system 100, by using integrated cryptographic keys and/or authorizations that can be provided when a set of predefined conditions are satisfied. Further details of the operation of the TPM will be provided below. Although the TPM 108 of FIG. 1 is a discrete processor, other embodiments of the invention may comprise alternative implementations, such as TPMs integrated in the processor 102, firmware TPMs that are implemented along with the UEFI software, hypervisor TPMs or software TPMs. In some embodiments the TPM 108 is not accessible by a user of the computer system 100. In some embodiments, the TPM 108 resides in a read-only memory of the computer system 100. The TPM 108 may be configured to perform operations that can verify a dynamically launched ephemerally running trusted software or trusted operating system, TrustedOS, such as one launched using a Dynamic Root of Trust Measurement (DRTM) operation for measured platform initialization while the computer system 100 is in a running state of operation, i.e. during runtime of the PrimaryOS. As such, a DRTM operation can be used to determine if the computer system has been at least partially compromised or not during runtime of a TrustedOS. In some embodiments, the TPM can perform a Static Root of Trust Measurement (SRTM) or operation where the entire boot chain is measured and determined if it is as previously defined, or in other words, if the boot chain is uncompromised. In some embodiments, the TPM can perform a Core Root of Trust Measurement (CRTM) during boot process for subsequent attestation of other firmware and software that is executed on the computer system.

Computer system 100 also comprises a storage media 110. Storage media 110 is split into n contiguous and non-overlapping portions or ranges 112a, 112b, . . . , 112n of logical blocks. Each logical block may be assigned a unique address and thus each portion may comprise a set of logical block addresses (LBAs). Additionally, the storage media 110 may be split into partitions. A partition may comprise a number of portions. In some embodiments, the storage media 110 may comprise only partitions, and the partitions may not be separated into smaller portions. This arrangement may simplify the file hierarchy of the storage media 110. In some embodiments, all of the partitions and/or portions of the storage media 110 may be configured to be writable. In other embodiments, only some of the partitions and/or portions may be configured to be writable, with the remaining partitions being configured to be read-only. Portions or partitions that are read-only may be referred to as "locked", while portions or partitions that are writable may be referred to as "unlocked" accordingly. In some embodiments storage media 110 may be removable from the computer system 110 for improved portability. For example, in some embodiments, storage media 110 may be an SD or Flash card, an external Solid State Drive etc.

In the embodiment of FIG. 1 the storage media 110 comprises a portion 112o on which the PrimaryOS has been installed or stored. In the embodiment of FIG. 1 portion 112o has been configured to be a read-only portion of the storage media 110 as indicated by the illustrated portion being shaded. In other embodiments however, the PrimaryOS may be stored in a writable portion of the storage media 110.

The PrimaryOS includes an application which will be referred to as the TrustedOS. The TrustedOS may be configured to assume control of the hardware resources and software resources of the computer system and request cryptographic keys and/or authorizations from the TPM. The TrustedOS may be small enough such that the total of it can be loaded in a kernel memory accessible by the processor 102 of the computer system 100. Although in the illustrated embodiment the TrustedOS is an application that runs on the PrimaryOS, in other embodiments, TrustedOS may be an entirely separate operating system that may be loaded on kernel memory during runtime of the PrimaryOS to assume control of the hardware resources and software resources of the computer system. In some embodiments, the TrustedOS may be stored on a different portion to the PrimaryOS. In some embodiments, TrustedOS may be stored on a different storage media to the PrimaryOS. In some embodiments, TrustedOS may be stored on a read-only memory of the computer system 100.

In some embodiments, storage media 110 may comprise a self-encrypting drive according to the OPAL specifications wherein ranges of LBAs are associated with an encryption key, and all data read or written on these ranges are encrypted or decrypted with the respective encryption key of each range. Alternatively or additionally, storage media 110 may comprise drives according to Opalite specifications (to provide data-at-rest protection of user data via data encryption and access controls and pre-boot authentication) or Pyrite specifications (thus blocking or granting access to data based on logical operations). In some embodiments, storage media 110 may be configured such that authorization is required to lock or unlock portions and/or partitions of the storage media 110. In some embodiments, storage media 110 may be configured such that authorization is required to read and/or write entries in a partition table of the storage media 110. In embodiments in which authorization is required to lock or unlock portions and/or partitions of the storage media 110 or to read and/or write entries in a partition table of the storage media 110, this authorization may take the form of knowledge of a password or a cryptographic key. In some embodiments the authorization may be verified by a password-based system, made accessible through a D-RTM operation and/or a Trustzone operation.

In some embodiments, the TPM 108 may store and/or seal cryptographic keys and/or authorizations (e.g. passwords) that are necessary for the storage media 110 to lock or unlock certain partitions or portions. Additionally or alternatively, the TPM 108 may store and/or seal cryptographic keys and/or authorizations that are necessary to manipulate a partition table of the storage media 110. The TPM may be configured to export any of the above cryptographic keys and/or authorizations in response to a successful operation comprising a root of trust measurement, (e.g. a DRTM, a CRTM and/or a SRTM process). In the context of this specification, an authorization may refer to any information that enables an entity to prove to another entity that they are entitled to perform an action, i.e. that they satisfy predefined conditions for performing said action.

Figure 2:
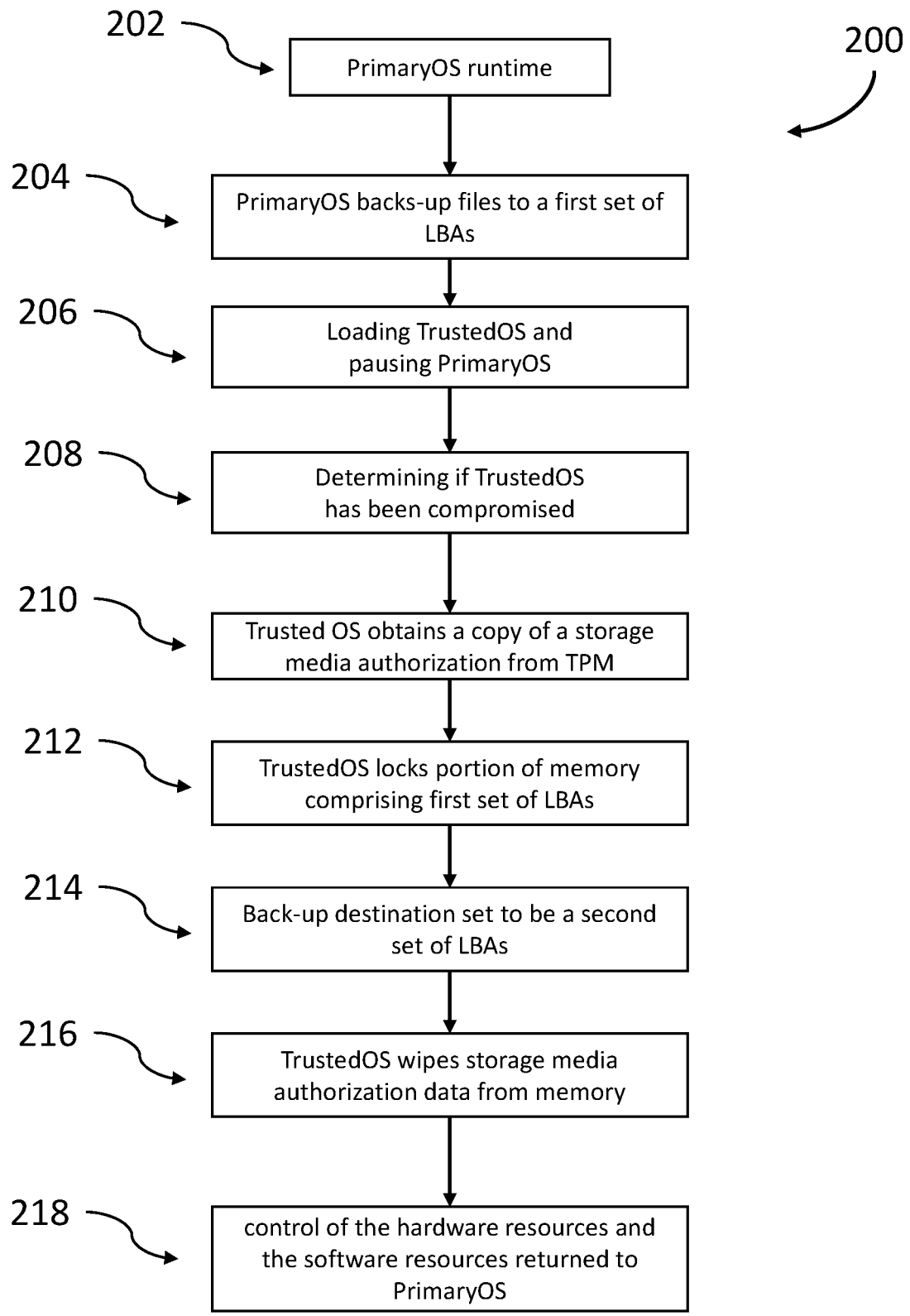
FIG. 2 is a flow chart of a method for providing ransomware protection to a computer system like the one illustrated in FIG. 1.

The present disclosure includes three main aspects. These are: 1) the manner in which the system performs backups; 2)

the manner in which the system us recovered in the event of a malware attack; and 3) the manner in which the system is initially set up. FIG. 2 illustrates a flow chart 200 of a method for providing system backups for a computer system 100, such as the one illustrated in FIG. 1. This method assumes that the computer system is operating normally, under the control of the PrimaryOS.

At step 202, the computer system 100 is operating under PrimaryOS runtime. The computer system 100 has booted into the PrimaryOS, and the PrimaryOS is responsible for managing hardware resources and software resources, and for backing-up files. The PrimaryOS is configured to provide backups of the computer system or of files generated by or stored in the computer system. PrimaryOS may provide backups periodically, e.g. once a minute, once an hour, once a day or once a week, or any other reasonable backup period. Additionally, or alternatively, PrimaryOS may back-up at least one file whenever the at least one file or subdirectory hosting the at least one file is changed. Additionally, or alternatively, PrimaryOS may back-up files of only predefined types to reduce the size of the back-ups.

At step 204, the PrimaryOS backs-up files to a first set of logical block addresses of storage media 110, in which the first set of logical block addresses are on the first portion 112a of the storage media 110. Backing-up files may comprise incremental back-ups, in which the PrimaryOS only backs-up the data that has changed in each file since the previous backup, or full back-ups of each file irrespectively of whether the file has been previously backed-up. In some embodiments, the first back-up performed by the PrimaryOS may be a full back-up, which may comprise copies of all user-created files, and all files necessary to return the computer system to its initial state, including installation files for PrimaryOS.

At step 206, TrustedOS is loaded, PrimaryOS enters a paused state (i.e. the execution environment or runtime environment of the PrimaryOS is paused) and at step 208 an RTM operation is executed to determine if TrustedOS is compromised, e.g. by checking if the TrustedOS is in a predetermined state or not. This is not done here as part of the recovery process, but in order to determine whether TrustedOS has been compromised and whether it should obtain authorization to lock the first portion 112a of the storage media 110. In some embodiments, if the TrustedOS is compromised, then no backup should be made. This is especially important if the backup is arranged to overwrite the previous backup. In some embodiments, if the TrustedOS is compromised as indicated by the RTM or DRTM operation concluding unsuccessfully, the computer system 100 may inform the user that the system is at least partially compromised, and that the system should be rebooted for a recovery process to begin as explained later. In some embodiments, the reboot process may happen automatically, although critical infrastructure like servers would likely omit a feature of automatic rebooting after a compromise was detected to ensure no loss of service or data.

Step 206 and/or step 208 may comprise loading TrustedOS to a CPU memory, e.g. a kernel memory and performing a DRTM operation on the contents of the kernel memory comprising the TrustedOS. The DRTM operation may be considered successful if the contents of the kernel memory comprising the TrustedOS match predefined values stored in Platform Configuration Registers. In response to determining that the TrustedOS has not been compromised, or in other words that the DRTM operation was successful the process proceeds to step 210. Step 206 may be scheduled to occur periodically at predefined times, or in response to the computer system detecting a period of low activity.

At step 210, the TrustedOS requests via the processor 102 from the TPM 108 a copy of a storage media authorization. The storage media authorization may be locked to values in predefined Platform Configuration Registers (PCR) of the TPM 108, for example, PCR 17 and or 18. The storage media authorization may be a password sealed in the TPM and inaccessible by the processor during PrimaryOS runtime. The TPM 108 may be configured to refuse decryption of authorizations or passwords or to refuse NV indexes to be read if the PCR registers of the TPM do not contain specific predetermined values. However, a successful DRTM operation that verifies that TrustedOS is as predefines will result in the TPM providing to the TrustedOS a copy of the storage media authorization.

At step 212, the TrustedOS disables writing to the first portion 112a of the storage media 110, the first portion 112a comprising the first set of logical block addresses. This is done in order to lock the first backup. The process of disabling writing to the first portion 112a of the storage media 110 will be explained further in association with FIGS. 5 and 6. At step 214, the TrustedOS configures PrimaryOS so that during the next backup, the PrimaryOS will back-up files to a second set of logical block addresses on a second writable portion 112b of the storage media 110.

At step 216, the TrustedOS may optionally erase the copy of a storage media authorization that was used to lock the first portion 112a from any memory accessible by the PrimaryOS. At step 218, the TrustedOS returns control of the hardware resources and the software resources to the PrimaryOS. Step 218 may be considered as resuming the execution environment of the PrimaryOS.

Advantageously, the process of FIG. 2 enables the computer system 100 to back-up data in portions of the storage media that cannot be affected by malware later by virtue of residing in read-only parts of the storage media after completion of method 200. In the case where the TrustedOS becomes compromised or that PrimaryOS is manipulated to load a malware instead of TrustedOS, this would result in the RTM process of step 206 being unsuccessful, and the TPM would not provide a copy of the storage media authorization. This in turn ensures that the previously backed-up files would remain in a portion of the storage media that would be read-only, and safe from the malware.

Another advantage of the process of FIG. 2 is that backing-up data or files happens during regular runtime of the PrimaryOS. Therefore, backing-up data does not require the computer system 100 to reboot. This is especially useful when the computer system 100 is server which is configured to run continuously for long periods of time. Unlike known anti-malware that can only back-up files after a predefined boot sequence has been verified, and therefore require the system to reboot, a system according to the invention can go months or even years without a pause in service.

Figure 3:
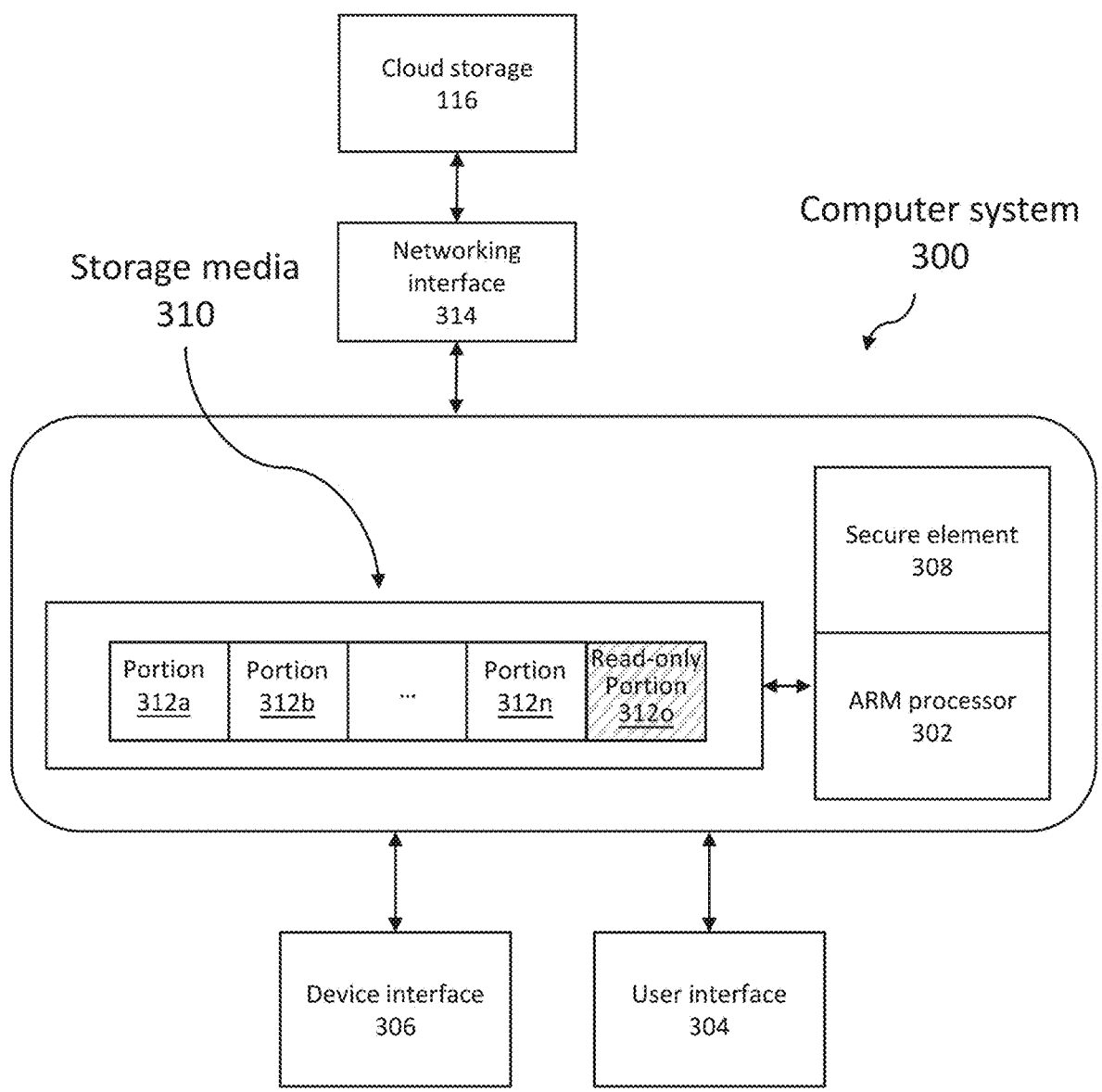
FIG. 3 is a schematic diagram of a system architecture of an apparatus like a device using an ARM architecture for providing ransomware protection.

FIG. 3 schematically illustrates another apparatus that can be used to implement a method for securing data of a computer system 300 from malware according to the invention. The computer system 300 may be a device based on ARM architecture. The computer system of FIG. 3 is configured to use a Primary Operating System (PrimaryOS) for incrementally backing-up files in a manner that provides malware protection as explained later. PrimaryOS may be any operating system such as any version of MS Windows, Android, any Linux distribution such as Debian, Red Hat Linux or the like, any version of MacOS or other Unix-based operating systems.

Computer system 300 comprises at least one ARM processor 302, which may be a Cortex-M or Cortex-A ARM processor, although in other embodiments of the invention the computer system may comprise other processors.

The device of FIG. 3 shares a number of features with the device of FIG. 1, and therefore for brevity we note that it comprises a User Interface 304 similar to User Interface 104, a Device Interface 306 similar to Device Interface 106, a Networking Interface 314 similar to Networking Interface 114 to enable access to Cloud Storage 116 and a storage media 310 similar to storage media 110, and divided into portions and/or partitions accordingly.

However, unlike computer system 100, computer system 310 may not have TPM 108. Instead processor 203 may have a different, and in some embodiments integrated, Secure Element 308 which may enable Hypervisor operations, and additionally or alternatively Trustzone operations. Trustzone provides a foundation for system-wide security and the creation of a trusted platform and is configured to boot and reside in memory before any other operating system is loaded in the memory of computer system 300. Trustzone may provide an isolated environment from the environment of the PrimaryOS. Additionally, or alternatively, PrimaryOS may be a virtual operating system, running inside TrustZone. In some embodiments, a version of TrustedOS may be an application that is executable by Trustzone, such that Trustzone can perform the actions of TrustedOS described previously and/or later in this specification. Trustzone may be able to verify various aspects of the computer system 300 or of information stored on computer system 300 via a root of trust measurement operation.

Computer system 300 may be initially arranged so that a full copy of the initially loaded PrimaryOS (e.g. Android) is copied to a region which is then marked as read only or locked. Another region is designated as being available for a "backup partition" which is read/write. The partition table itself is marked read only. The Android system is configured to perform incremental backups onto the backup partition. At some point, either periodically, or when the system is under low usage (or both), the Android OS may request that TrustZone takes over control of the computer system 300. TrustZone with TrustedOS can then proceed with locking parts of the storage media 310 as explained below.

Figure 4:
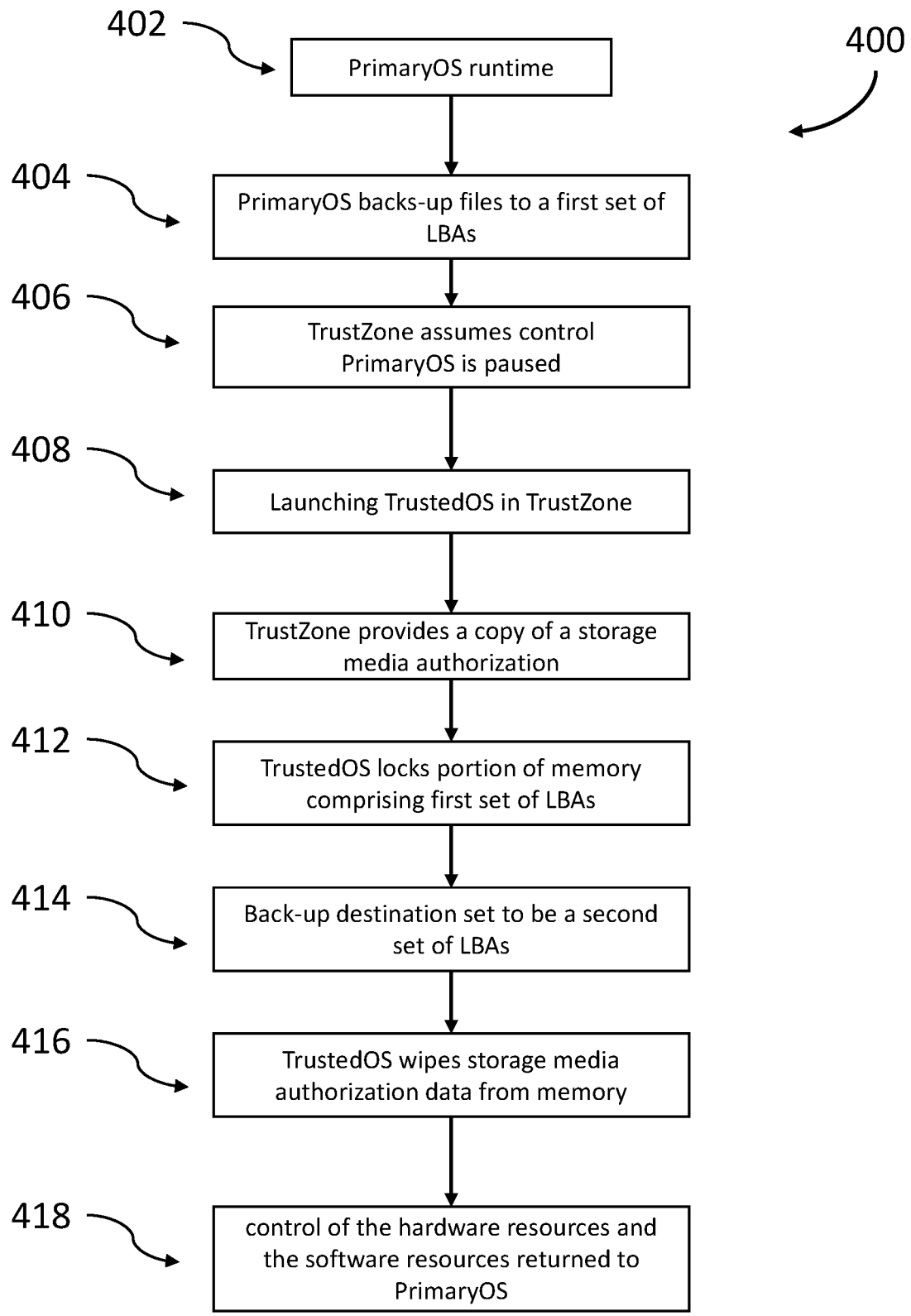
FIG. 4 is a flow chart of a method for providing ransomware protection to a device like the one illustrated in FIG. 3.

FIG. 4 is a flow chart of a method 400 for providing data backup to a device like the one illustrated in FIG. 3. At step 402, the computer system 300 is on PrimaryOS runtime. Computer system 300 may be configured to boot first into the Hypervisor (i.e. Trustzone), and subsequently the Hypervisor loads PrimaryOS. PrimaryOS is provided by the Hypervisor a set of hardware resources and software resources for backing-up files.

At step 404, PrimaryOS backs-up files to a first set of logical block addresses of storage media 310, wherein the first set of logical block addresses are on the first portion 312a of the storage media 310. Backing-up files may comprise incremental back-ups, wherein PrimaryOS only backs-up the data that has changed in each file since the previous backup, or full back-ups of each file irrespectively of whether the file has been previously backed-up.

At step 406, PrimaryOS is paused and control of the computer system is assumed by Trustzone. TrustZone may store the state of PrimaryOS to enable seamless resumption of PrimaryOS after the method 400 concludes. TrustZone has access and/or knowledge of the storage media authorization.

At step 408, TrustZone launches TrustedOS.

At step 410, TrustZone through TrustedOS provides a copy of a storage media authorization or alternatively TrustZone provides to TrustedOS a copy of a storage media authorization. The storage media authorization may be a first cryptographic key or a password and may be inaccessible by the PrimaryOS. At step 412, TrustedOS disables writing to the first portion 312a of the storage media 310, the first portion 312a comprising the first set of logical block addresses.

The process of disabling writing to the first portion 312a of the storage media 310 will be explained further in association with FIGS. 5 and 6.

At step 414, the TrustedOS configures PrimaryOS so that henceforth the PrimaryOS will back-up files to a second set of logical block addresses on a second writable portion 312b of the storage media 310. At step 416, TrustedOS may optionally erase the storage media authorization that was used to lock the first portion 312a from any memory accessible by the PrimaryOS. At step 418, TrustZone returns control of the hardware resources and the software resources to the PrimaryOS. As such, at the end of step 418, the execution environment of PrimaryOS is resumed or in other words the PrimaryOS is unpaused.

Figure 5A:
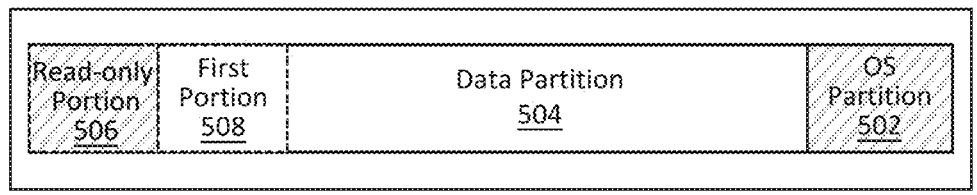
FIGS. 5a, 5b, and 5c schematically illustrate the effect of a method according to the invention for securing data of a computer system from malware on a storage media of the computer system.
Figure 5B:
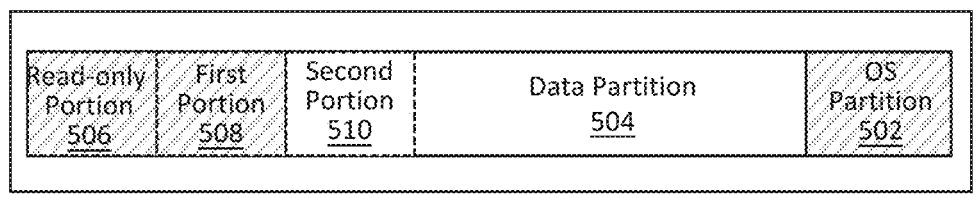
Figure 5C:
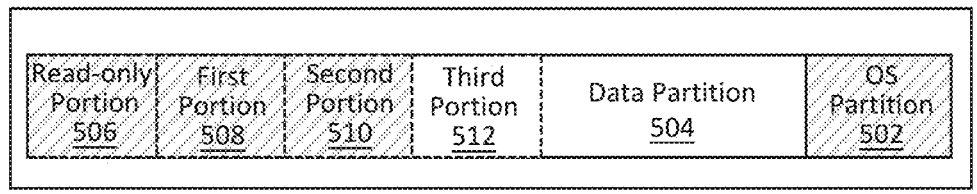

FIGS. 5a-5c schematically illustrate how TrustedOS may lock a previously unlocked portion of the storage media 110 or 310 to protect data against ransomware.

FIG. 5a schematically illustrates an example of how storage media 110 or 310 may be during runtime of PrimaryOS according to an embodiment of the invention. Storage media 110 or 310 may be configured according to an OPAL configuration such that portions that comprise a set of LBAs may be locked or unlocked if authorization is provided. Storage media 110 or 310 may be separated in two partitions. The PrimaryOS or other operating systems may be stored and/or installed on partition 502, i.e. the "OS" partition whilst the rest of the storage media 110 or 310 form partition 504, i.e. the "data" partition. In FIGS. 5a-5c the partition 502 is a read-only partition, as indicated by the striped pattern, to reduce the likelihood of PrimaryOS being permanently compromised, although in other embodiments the PrimaryOS may be installed in a writable partition or portion of the storage media. Although in the illustrated example of FIG. 5 the PrimaryOS is located in the storage media used to back-up the files, other embodiments of the invention may use separate storage media for storing the PrimaryOS and the backed-up files. The data partition 504 comprises a locked, or read-only portion 506, wherein previously backed-up files may be stored, although other embodiments may initially have all portions be writable.

In the example of FIG. 5a, the PrimaryOS is configured to back-up files to first portion 508. When TrustedOS obtains the storage media authorization from the TPM or TrustZone accordingly as explained with respect to FIG. 2 or 4, first portion 508 is locked as indicated in FIG. 5b, and PrimaryOS is configured to henceforth back-up data on a second portion 510 of the data partition 504. The process may repeat as described in FIG. 5c, wherein for a second time TrustedOS has been loaded and verified to be a predefined, i.e. uncompromised, and TrustedOS, based on the obtained storage media authorization locks second portion 510 and configures PrimaryOS to henceforth back-up date on a third portion 512.

Figure 6A:
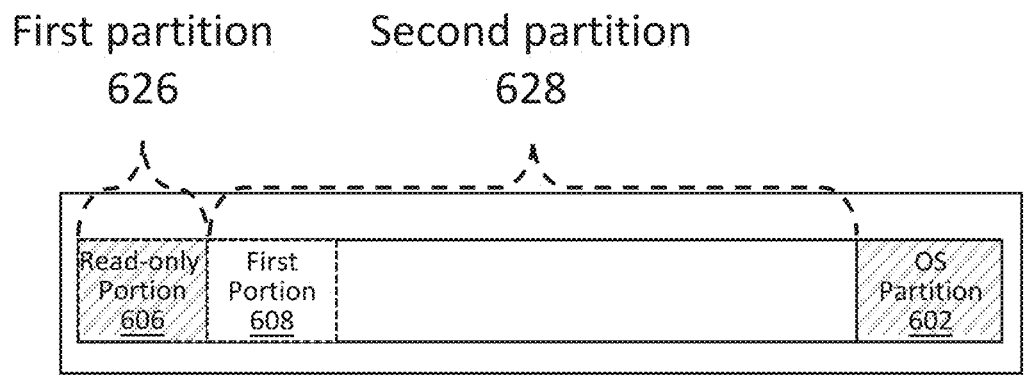
FIGS. 6a, 6b, and 6c schematically illustrate the effect of another method according to the invention for securing data of a computer system from malware on a storage media of the computer system.
Figure 6B:
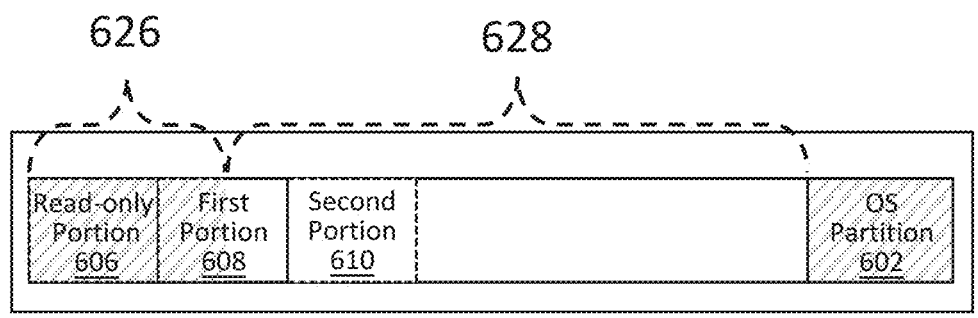
Figure 6C:
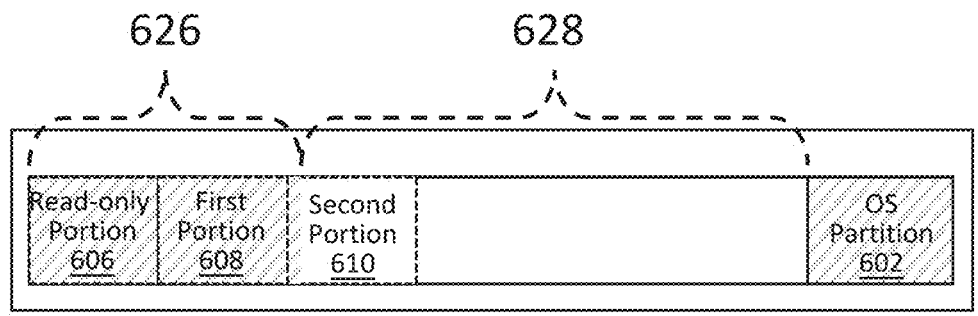

FIGS. 6a-6c schematically illustrate another way that TrustedOS may employ to lock a previously unlocked portion of the storage media 110 or 310 to protect data against ransomware.

The storage media of FIGS. 6a-6c may be similar to the storage media described in FIGS. 5a-5c and included in computer systems 100 and 300, and thus comprise a read-only portion 606 and a first portion 608 which may have been already used to back-up files. However, in this example amending entries on the partition table of the storage media requires authorization, similar to the storage media authorization discussed above. Furthermore, read-only portion 606 may be part of a first partition 626, which is defined in the partition table of the storage media as read-only, whilst first portion 608 may be part of a second partition 628 which is defined in the partition table of the storage media as writable. The read-only portion 606 and the first portion 608 in FIG. 6a share a boundary. As such, the process of disabling writing on the first portion 608 may comprise TrustedOS obtaining authorization from the TPM or TrustZone accordingly as explained with respect to FIG. 2 or 4 to edit the entries on the partition table of the storage media such that the first partition 626 extends to encompass the LBAs of the first portion 608 which had been used to back-up files. Correspondingly, the second partition 628 contracts, and the PrimaryOS is configured to direct future back-ups of data on the unused LBAs of the first portion 608. If the system remains uncompromised, the process repeats as described in FIG. 6c, wherein the TrustedOS, based on the obtained storage media authorization moves the boundary between the read-only first partition 626 and the writable second partition 628 such that previously used LBAs are moved to the read-only partition of the storage media.

Changing the size of the read-only portion 606 and the first portion 608 may include assigning an incrementally numbered label to each portion. The process may also comprise editing the partition table to create new partitions, which may also be assigned an incrementally numbered label. Assigning incrementally numbered labels to the portions is especially useful in embodiments comprising a hypervisor like TrustZone, as it enables an efficient way to indicate to PrimaryOS (e.g. Android) where new backups should be stored. As a result, seamless integration between TrustZone and Android is achieved, despite TrustZone manipulating data on the storage medium while Android is paused.

Figure 7:
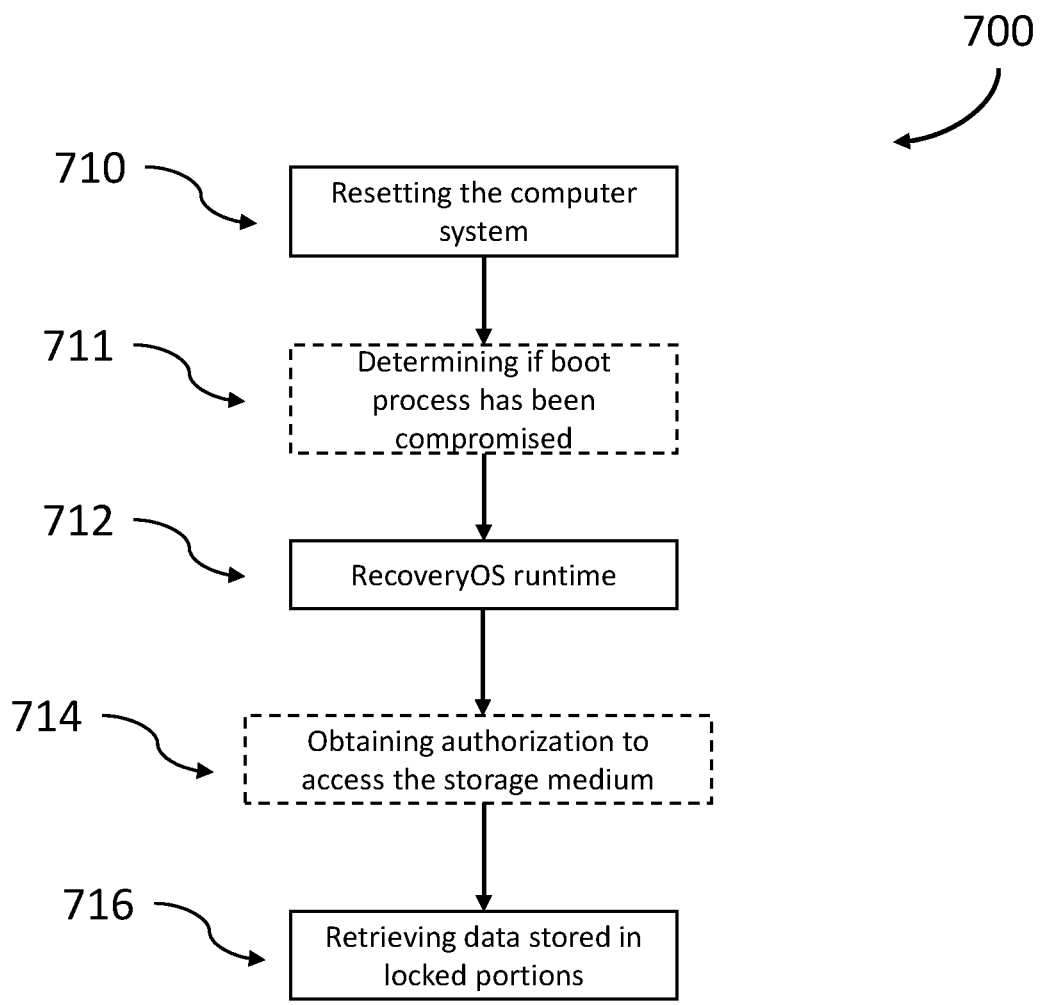
FIG. 7 is a flow chart of a method according to the invention for recovering from a compromised computer system files that were previously backed-up using any of the methods illustrated in FIG. 2 or 4.

As noted above, the present disclosure includes three main aspects. These are: 1) the manner in which the system performs backups; 2) the manner in which the system us recovered in the event of a malware attack; and 3) the manner in which the system is initially set up. FIG. 7 is a flow chart of a method 700 according to the disclosure for recovering a computer system following a malware attack. The recovery process requires that the system was previously backed up using any of the methods described in connection with FIG. 2 or 4.

At step 710, the computer system is reset or powered on. Step 710 may comprise a cold boot and the computer system may be configured to boot into a Recovery Operating System (RecoveryOS). In some embodiments, the computer system may be configured such that every time it undergoes a power cycle, i.e. for cold or warm boots, the computer system must boot into RecoveryOS. In embodiments comprising a hypervisor like TrustZone as explained above, the RecoveryOS may comprise a set of applications that are executed by TrustZone prior to any other operating system is launched.

Optionally, prior to booting into the RecoveryOS, at step 711 the computer system may perform a CRTM operation to verify that the booting process is not compromised. The RecoveryOS may have been previously installed on a first read-only or locked portion of the storage medium. Alternatively, the RecoveryOS may be part of the Unified Extensible Firmware Interface (UEFI) used on the computer system, and/or be the same as TrustedOS.

At step 712, the RecoveryOS is in runtime, and enables access to at least one of the one or more data backups stored in locked portions or partitions of the storage media.

At step 716, the RecoveryOS retrieves or restores data previously stored in locked portions or partitions of a storage medium.

Optionally, accessing read-only portions of the storage medium may comprise the RecoveryOS obtaining authorization to access the storage medium from a secure element like the TPM or TrustZone. This process occurs before step 716, at step 714.

Further optionally, obtaining authorization to access the storage medium from a secure element like the TPM or TrustZone may comprise an RTM operation that verifies that the RecoveryOS has not been compromised, similar to the process described above with relation to TrustedOS, or an RTM operation that verifies that the boot sequence has not been compromised, based on ensuring that the values in PCR registers in the secure element are as predefined.

As such, the process of FIG. 7 provides to a user a means to enter a recovery state. In this state, RecoveryOS and/or TrustZone provides the user the ability to restore the system to how it was initially setup and/or to evolve the computer system to comprise all changes in however many of the backup partitions have been made since the system was initially setup. To facilitate the process, the backed-up changes (i.e. restore points) may be displayed in order of creation. As such, the disclosures of this specification may be applied not only as a method to recover from a malware or ransomware attack, but as a method to return the computer system to various points in time, in a secure manner.

In embodiments where the storage medium is a self-encrypting drive, obtaining authorization to access the storage medium from a secure element may comprise the secure element providing a password, or cryptographic key required by the self-encrypting drive to encrypt and/or decrypt data stored on the self-encrypting drive.

Alternatively, or additionally, RecoveryOS may enable a user to return the computer system to an initial state, i.e. the state of the computer system when RecoveryOS was installed on the computer system. Advantageously, RecoveryOS is accessible even when the system has not been affected by a malware, and may enable restoring the one or more data backups to return the computer system to a state as was when the data backups were made.

Figure 8:
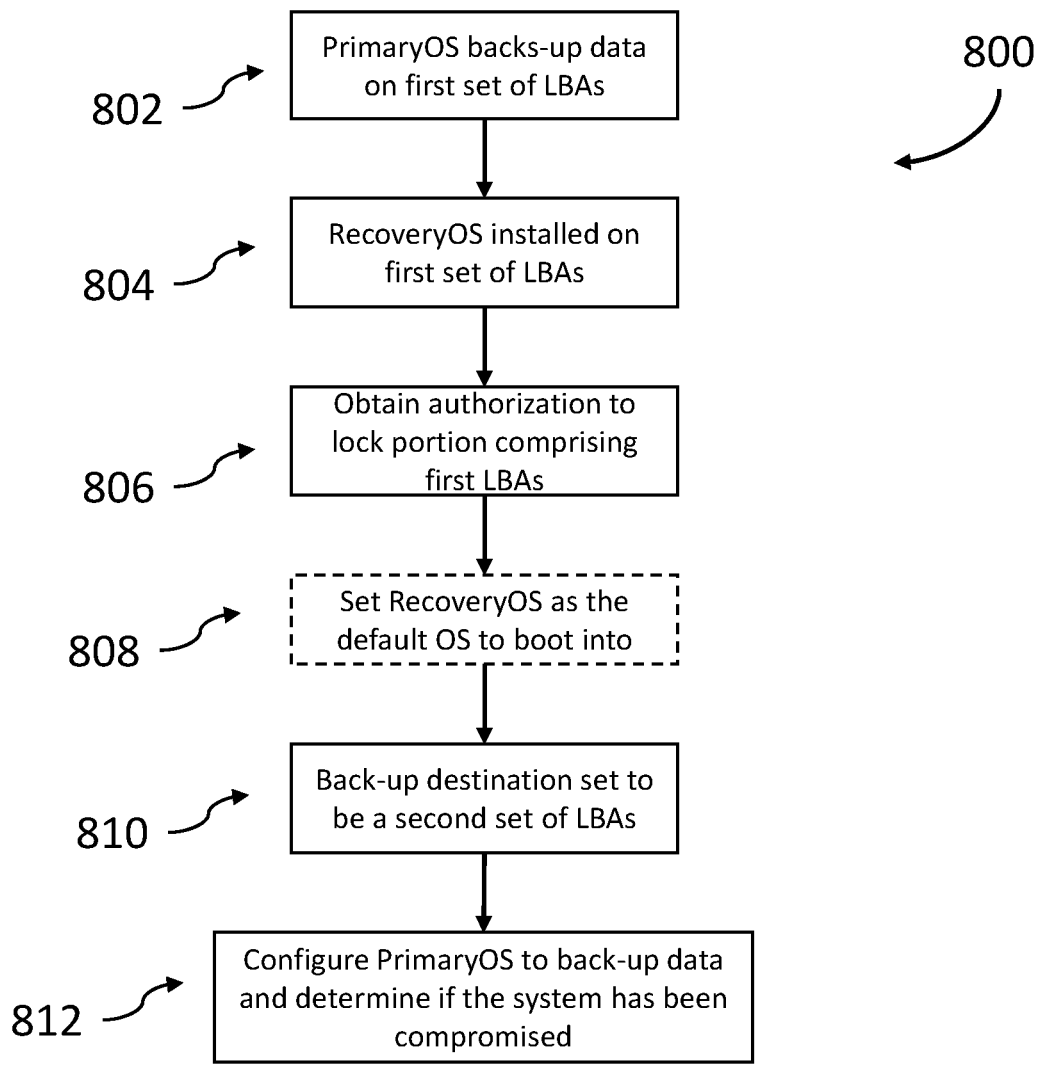
FIG. 8 is a flow chart of a method according to the invention for configuring a computer system to incrementally back-up using any of the methods illustrated in FIG. 2 or 4.

FIG. 8 is a flow chart of a method according to the invention for configuring a computer system to back-up files using any of the methods illustrated in FIG. 2 or 4.

At step 802, during runtime of PrimaryOS the computer system performs an initial back-up of files to a first set of LBAs on the storage media.

At step 804 RecoveryOS is installed to the first set of LBAs on the storage media, without overwriting the initial back-up of files.

At step 806, the computer system obtains authorization or authorization credentials from the TPM or TrustZone accordingly as explained with respect to FIGS. 2 and/or 4, to convert the first portion of the storage media to read-only, i.e. to lock the first portion of the storage media as explained with respect to FIGS. 5 and/or 6.

At step 808, the computer system may optionally configure the booting process to automatically boot into the RecoveryOS, unless a predefined input is provided to the computer system during the boot process.

At step 810, PrimaryOS is configured to henceforth perform back-ups on a second set of LBAs on the storage media, the second set of LBAs being on a writable portion or range of the storage media.

At step 812, PrimaryOS is configured to perform any of the methods of FIG. 2 or 4.

Although the invention has been described above with reference to one or more preferred embodiments, it will be appreciated that various changes or modifications may be made without departing from the scope of the invention as defined in the appended claims. The word "comprising" can mean "including" or "consisting of" and therefore does not exclude the presence of elements or steps other than those listed in any claim or the specification as a whole. The mere fact that certain measures are recited in mutually different dependent claims does not indicate that a combination of these measures cannot be used to advantage.

Before going on to set out the claims however, we first provide the following list of clauses, which point out some features of some embodiments of the invention:

Clause 1. A method for backing up data in a computer system, wherein the computer system comprises:
 a Primary Operating System (PrimaryOS) stored on a storage medium and configured to control the hardware resources and the software resources of the computer system;
 a secure element configured to provide root of trust measurement (RTM) operations; and
 one or more data backups, created by the PrimaryOS, and stored in a first backup portion of the storage medium;
 the method comprising:
  during a PrimaryOS run-time, loading a Trusted Operating System (TrustedOS) and pausing the execution environment of PrimaryOS;
  determining if the TrustedOS is in a predefined state based on a RTM operation provided by the secure element;
  in response to determining that the TrustedOS is in the predefined state, providing, by the secure element, the TrustedOS with authorization to make the first backup portion of the storage medium read-only;
  making the first backup portion of the storage medium read-only using the TrustedOS;
  configuring the PrimaryOS to perform a new backup in order to create a further data backup in a second backup portion of the storage media; and
  resuming the execution environment of the PrimaryOS.

Clause 2. A method according to clause 1, further comprising: if it is determined that the TrustedOS is not in the predefined state, undertaking no further backups.

Clause 3. A method according to any preceding clause, wherein failing to verify that the TrustedOS is in the predefined state is caused by malware or ransomware.

Clause 4. A method for backing up data in a computer system, wherein the computer system comprises:
 a secure element configured to provide root of trust measurement (RTM) operations;
 a Hypervisor, having control of the hardware resources and the software resources of the computer system based on the secure element;
 a Primary Operating System (PrimaryOS) stored on a storage medium and provided at least a subset of the hardware resources and the software resources of the computer system by the Hypervisor; and
 one or more data backups, created by the PrimaryOS, and stored in a first backup portion of the storage medium;
 the method comprising:
  during a PrimaryOS run-time, pausing the execution environment of PrimaryOS;
  launching, by the Hypervisor, a Trusted Operating System (TrustedOS);
  providing, by the Hypervisor, the TrustedOS with authorization to make the first backup portion of the storage medium read-only;
  making the first backup portion of the storage medium read-only using the TrustedOS;
  configuring the PrimaryOS to perform a new backup in order to create a further data backup in a second backup portion of the storage media; and
  resuming the execution environment of the PrimaryOS.

Clause 5. A method according to any preceding clause, wherein the step of providing the TrustedOS with authorization includes: the secure element providing the TrustedOS with a copy of an authorization value stored in the secure element.

Clause 6. A method according to clause 4, further comprising: the TrustedOS removing the copy of the authorization value from any storage medium accessible to the PrimaryOS before resuming the execution environment of the PrimaryOS.

Clause 7. A method according to clause 5 or 6, further comprising: the TrustedOS using the copy of the authorization value to provide authorization for making the first backup portion read-only.

Clause 8. A method according to any preceding clause, wherein the one or more data backups and the further backup include one or more of: a full backup of all system data, a backup of the PrimaryOS and system applications, including user settings, and a backup user of user data.

9. A method according to any preceding clause, wherein the one or more backups comprise an initial backup and optionally one or more incremental backups, and the further backup is an incremental backup.

Clause 10. A method according to any preceding clause, wherein the PrimaryOS is stored on an operating system partition of the storage medium.

Clause 11. A method according to any preceding clause, wherein:
 the first backup portion of the storage media is in a writable partition of the local storage that shares a boundary with a read-only partition of the data partition; and
 making the first backup portion of the storage medium read-only comprises moving the boundary between the writable partition and the read-only partition such that, after moving the boundary, the read-only partition of the local storage comprises the first backup portion and wherein
 moving the boundary between the writable partition and the read-only partition comprises amending a partition table of the storage media; and
 amending the partition table of the storage media requires authorization by the storage media.

Clause 12. A method according to any preceding clause, wherein the storage media comprises a plurality of portions, the plurality of portions comprising the first and second backup portions; and
 each portion of the plurality of backup portions can be in a writable state or a read-only state and changing the state of the portions requires authorization by the storage media.

Clause 13. A method according to clause 11 or 12, wherein the authorization provided by the secure element to the TrustedOS is the authorization required by the storage media.

Clause 14. A method according to clause 12 or 13, wherein the authorization is verified by a password-based system, a D-RTM operation and/or a TrustZone operation.

Clause 15. A method according to any of the preceding clauses, wherein the PrimaryOS periodically performs incremental back-up of files to writable portions on the storage media during runtime.

Clause 16. A method according to any of the preceding clauses, wherein the storage media is removable or part of a cloud storage.

Clause 17. A method according to any of clauses 1 to 16, wherein the computer system is configured to perform TrustZone operations and wherein the TrustedOS obtains the cryptographic key based on a TrustZone operation.

Clause 18. A method according to clause 17, wherein the steps performed by the TrustedOS are part of the TrustZone operations.

Clause 19. A method according to any of the preceding clauses wherein the storage medium is a self-encrypting drive.

Clause 20. A method for securing a computer system against malware, wherein the computer system comprises:
 a Primary Operating System (PrimaryOS) stored on an operating system partition on a storage medium and configured to control hardware resources and software resources for backing-up files to a first backup portion of the storage media, the method comprising:
 installing a Recovery Operating System (RecoveryOS) into the first backup portion of the storage media, the first portion;
 making the first backup portion of the storage media to be read-only;
 configuring the PrimaryOS to perform a new backup in order to create a further data backup in a second backup portion of the storage media.

Clause 21. A method according to clause 21, further comprising
 configuring the computer system to boot in the RecoveryOS unless a predefined input is provided to the computer system during the boot process.

Clause 22. A method for restoring data from a computer system, wherein the computer system includes:
 a Primary Operating System (PrimaryOS) for backing-up data from the computer system to a storage medium;
 a Recover Operating System (RecoveryOS) installed in a first read-only portion of the storage medium; and
 one or more data backups, created by the PrimaryOS, and stored in a second read-only portion of the storage medium;
 the method comprising:
  booting the computer system into the RecoveryOS; and
  retrieving, using the RecoveryOS, at least one of the one or more data backups from the second read-only portion of the storage medium.

Clause 23. A method according to clause 22, wherein the computer system further comprises a secure element configured to provide authorization for accessing read-only portions of the storage medium, the method further comprising:
 obtaining, using the RecoveryOS, from the secure element, authorization to access the storage medium; and
 enabling, based on the authorization, the RecoveryOS to access the second read-only portion of the storage-medium.

Clause 24. A method according to clause 22 and 23, further comprising:
 prior to booting the computer system, during a PrimaryOS run-time, determining if the computer system has entered compromised state; and
 in response to determining that the computer system has been compromised, commencing a shutdown or restart process.

Clause 25. A method according to clause 24, wherein the step of determining if the system has entered a compromised state includes one or more of:
 a user determining that the system has entered a compromised state and initiating a reboot sequence;
 the computer system determine that the system has entered a compromised state and initiating, or giving a user the option to initiate, a reboot sequence.

Clause 26. A method according any of clauses 22 to 25, wherein the PrimaryOS is stored on an operating system partition of the storage medium.

Clause 27. A method according to any of clauses 22 to 26, wherein the system compromise is caused by malware or ransomware.

Clause 28. A method according to any of clauses 22 to 27, wherein the one or more data back-ups include one or more of: a full backup of all system data, a backup of the PrimaryOS and system applications, including user settings, and a backup user of user data.

Clause 29. A method according to any of clauses 22 to 28, wherein the one or more backups include an initial backup and optionally one or more incremental backups.

Clause 30. A method according to any of clauses 22 to 29, wherein the step of booting the computer system into the RecoveryOS comprises: successfully verifying a root of trust of the computer system during the booting process and/or successfully performing a root of trust measurement operation during the booting process.

Clause 31. An apparatus comprising a computer system and a storage medium, configured to implement any of the methods according to clauses 1-30.

Clause 32. A computer program or suite of computer programs configured to execute the method of any of clauses 1 to 30.

Clause 33. A computer-readable medium having the computer program of clause 32 stored thereon.

The invention claimed is:
1. A method for backing up data in a computer system, wherein the computer system comprises:
 a Primary Operating System (PrimaryOS) stored on a non-transitory storage medium and configured to control hardware resources and software resources of the computer system;
 a secure element configured to provide root of trust measurement (RTM) operations; and
 one or more data backups, created by the PrimaryOS, and stored in a first backup portion in a first writable partition of the non-transitory storage medium;
 the method comprising:
  during a PrimaryOS run-time, loading a Trusted Operating System (TrustedOS) and pausing an execution environment of PrimaryOS;
  determining that the TrustedOS is in a predefined state based on an RTM operation provided by the secure element;

in response to determining that the TrustedOS is in the predefined state based on the RTM operation provided by the secure element, providing, by the secure element, the TrustedOS with authorization to make the first backup portion of the non-transitory storage medium read-only;

making the first backup portion of the non-transitory storage medium read-only using the TrustedOS;

creating a second writable partition in the non-transitory storage medium;

configuring the PrimaryOS to perform a new backup to create a further data backup in a second backup portion in the second writable partition of the non-transitory storage medium; and resuming the execution environment of the PrimaryOS.

2. The method according to claim 1, further comprising:
determining that the TrustedOS is not in the predefined state; and
in response to determining that the TrustedOS is not in the predefined state, undertaking no further backups and identifying that failing to verify that the TrustedOS is in the predefined state is caused by malware or ransomware.

3. A method according to claim 1, wherein:
the first writable partition of the non-transitory storage medium shares a boundary with a read-only partition;
making the first backup portion of the non-transitory storage medium read-only comprises moving the boundary between the first writable partition and the read-only partition such that, after moving the boundary, the read-only partition of the the non-transitory storage medium comprises the first backup portion;
moving the boundary between the first writable partition and the read-only partition comprises amending a partition table of the non-transitory storage medium; and
amending the partition table of the non-transitory storage medium requires authorization by the non-transitory storage medium.

4. The method according to claim 1, wherein the non-transitory storage medium comprises a plurality of backup portions, the plurality of backup portions comprising the first and second backup portions; and
wherein each portion of the plurality of backup portions is in a writable state or a read-only state and changing the state of the portions requires authorization by the non-transitory storage medium.

5. The method according to claim 4, wherein the authorization provided by the secure element to the TrustedOS is the authorization required by the non-transitory storage medium.

6. The method according to claim 1, wherein at least one of the following is true:
the PrimaryOS periodically performs incremental backup of files to writable portions on the non-transitory storage medium during runtime;
the authorization is verified by a password-based system, a D-RTM operation, or a TrustZone operation;
the one or more data backups and the further backup include one or more of: (i) a full backup of all system data, (ii) a backup of the PrimaryOS and system applications, including user settings, or (iii) a backup user of user data; and
the one or more data backups comprise an initial backup and one or more incremental backups, and the further backup is an incremental backup.

7. The method according to claim 1, wherein the computer system performs TrustZone operations and wherein the TrustedOS obtains a cryptographic key based on a TrustZone operation, wherein the steps performed by the TrustedOS are part of the TrustZone operations.

8. The method according to claim 1, wherein the non-transitory storage medium is a self-encrypting drive, is removable, or is part of a cloud storage system.

9. The method according to claim 1, wherein the PrimaryOS is stored on an operating system partition of the non-transitory storage medium.

10. A system for backing up data, the system comprises
a processor; and
a non-transitory storage medium comprising:
a secure element configured to provide root of trust measurement (RTM) operations;
a Hypervisor configured to control hardware resources and software resources of the system based on the secure element;
a Primary Operating System (PrimaryOS) and configured to be provided at least a subset of the hardware resources and the software resources of the system by the Hypervisor;
a first writable partition comprising a first backup portion with one or more data backups, configured to be created by the PrimaryOS;
and
further instructions that are executable by the processor for causing the processor to perform operations, the operations comprising:
during a PrimaryOS run-time, pausing an execution environment of PrimaryOS;
launching, by the Hypervisor, a Trusted Operating System (TrustedOS);
providing, by the Hypervisor, the TrustedOS with authorization to make the first backup portion of the non-transitory storage medium read-only;
making the first backup portion of the storage medium read-only using the TrustedOS;
creating a second writable partition in the non-transitory storage medium;
configuring the PrimaryOS to perform a new backup to create a further data backup in a second backup portion in the second writable partition of the non-transitory storage medium; and
resuming the execution environment of the PrimaryOS.

11. The system of claim 10, wherein the operation of providing the TrustedOS with authorization includes: providing, by the secure element, the TrustedOS with a copy of an authorization value stored in the secure element, and
wherein the operations further comprise removing, by the TrustedOS, the copy of the authorization value from any storage medium accessible to the PrimaryOS before resuming the execution environment of the PrimaryOS.

12. The system of claim 11, wherein the operations further comprise: using, by the TrustedOS, the copy of the authorization value to provide authorization for making the first backup portion read-only.

13. The system of claim 10, wherein:
the first writable partition of the non-transitory storage medium shares a boundary with a read-only partition;
the operations further comprise:
making the first backup portion of the non-transitory storage medium read-only comprises moving the boundary between the first writable partition and the read-only partition such that, after moving the boundary, the read-only partition of the the non-transitory storage medium comprises the first backup portion;

moving the boundary between the first writable partition and the read-only partition comprises amending a partition table of the non-transitory storage medium; and amending the partition table of the non-transitory storage medium requires authorization by the non-transitory storage medium.

14. The system of claim 10, wherein the non-transitory storage medium comprises a plurality of backup portions, the plurality of backup portions comprising the first and second backup portions, wherein each portion of the plurality of backup portions is in a writable state or a read-only state, and wherein the operations further comprise changing the state of the portions only in response to receiving authorization by the non-transitory storage medium.

15. The system of claim 10, wherein the non-transitory storage medium is a self-encrypting drive, is removable, or is part of a cloud storage system, wherein the PrimaryOS is stored on an operating system partition of the non-transitory storage medium.

\* \* \* \* \*